US012375578B1

(12) United States Patent
Davis et al.

(10) Patent No.: US 12,375,578 B1
(45) Date of Patent: *Jul. 29, 2025

(54) DEVICE ARRANGEMENT FOR DERIVING A COMMUNICATION DATA SCHEME

(71) Applicant: Samsara Inc., San Francisco, CA (US)

(72) Inventors: Harrison Riley Davis, Oakland, CA (US); Elias Ray Dykaar, San Francisco, CA (US); Maxwell Anton Dergosits, San Francisco, CA (US); Ingo Gerhard Wiegand, San Francisco, CA (US); Justin Joel Delegard, West Chester, OH (US)

(73) Assignee: Samsara Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,459

(22) Filed: Apr. 19, 2024

Related U.S. Application Data

(63) Continuation of application No. 18/301,007, filed on Apr. 14, 2023, now Pat. No. 11,997,181, which is a
(Continued)

(51) Int. Cl.
*H04L 67/565* (2022.01)
*G07C 5/00* (2006.01)
*H04L 12/40* (2006.01)

(52) U.S. Cl.
CPC ............ *H04L 67/565* (2022.05); *G07C 5/008* (2013.01); *H04L 12/40006* (2013.01);
(Continued)

(58) Field of Classification Search
CPC ....... H04W 76/38; H04W 4/80; H04W 36/30; H04W 36/08; H04W 40/12; H04W 40/36; G09G 5/00
See application file for complete search history.

(56) References Cited

U.S. PATENT DOCUMENTS

| 4,862,594 A | 9/1989 | Schierbeek et al. |
| 4,937,945 A | 7/1990 | Schofield et al. |
| (Continued) | | |

OTHER PUBLICATIONS

U.S. Appl. No. 16/796,762 U.S. Pat. No. 11,140,236, filed Feb. 20, 2020, Device Arrangement for Deriving a Communication Data Scheme.
(Continued)

*Primary Examiner* — Iqbal Zaidi
(74) *Attorney, Agent, or Firm* — Schwegman Lundberg & Woessner, P.A.

(57) ABSTRACT

Disclosed are systems, methods, and non-transitory computer-readable media for a device arrangement to derive unknown portions of a communication data scheme. A proxy node is established in a communication path between two nodes configured to transmit communications according to a communication bus standard. The communication data included in the communications transmitted between the nodes conforms to a communication data scheme. The proxy node logs communications transmitted between the nodes via the communication path, resulting in a communication log. The communication log can then be used to derive unknown portion of the communication data scheme, such as commands for requesting specified data types and the data format for transmitting data of specified data types.

18 Claims, 8 Drawing Sheets

Related U.S. Application Data continuation of application No. 17/447,379, filed on Sep. 10, 2021, now Pat. No. 11,659,060, which is a continuation of application No. 16/796,762, filed on Feb. 20, 2020, now Pat. No. 11,140,236.

(52) U.S. Cl.
CPC .............. G07C 2205/02 (2013.01); H04L 2012/40215 (2013.01); H04L 2012/40273 (2013.01)

(56) References Cited

U.S. PATENT DOCUMENTS

| | | | |
|---|---|---|---|
| 5,131,154 | A | 7/1992 | Schierbeek et al. |
| 5,255,442 | A | 10/1993 | Schierbeek et al. |
| 5,550,677 | A | 8/1996 | Schofield et al. |
| 5,632,092 | A | 5/1997 | Blank et al. |
| 5,670,935 | A | 9/1997 | Schofield et al. |
| 5,796,094 | A | 8/1998 | Schofield et al. |
| 5,877,897 | A | 3/1999 | Schofield et al. |
| 5,924,212 | A | 7/1999 | Domanski |
| 6,266,588 | B1 | 7/2001 | Mcclellan et al. |
| 6,313,454 | B1 | 11/2001 | Bos et al. |
| 6,353,392 | B1 | 3/2002 | Schofield et al. |
| 6,396,397 | B1 | 5/2002 | Bos et al. |
| 6,477,464 | B2 | 11/2002 | Mccarthy et al. |
| 6,498,620 | B2 | 12/2002 | Schofield et al. |
| 6,549,834 | B2 | 4/2003 | Mcclellan et al. |
| 6,678,614 | B2 | 1/2004 | McCarthy et al. |
| 6,718,239 | B2 | 4/2004 | Rayner |
| 6,946,978 | B2 | 9/2005 | Schofield |
| 7,004,593 | B2 | 2/2006 | Weller et al. |
| 7,038,577 | B2 | 5/2006 | Pawlicki et al. |
| 7,151,996 | B2 | 12/2006 | Stein |
| 7,167,796 | B2 | 1/2007 | Taylor et al. |
| 7,386,376 | B2 | 6/2008 | Basir et al. |
| 7,526,103 | B2 | 4/2009 | Schofield et al. |
| 7,671,762 | B2 | 3/2010 | Breslau et al. |
| 7,859,392 | B2 | 12/2010 | Mcclellan et al. |
| 8,560,164 | B2 | 10/2013 | Nielsen et al. |
| 8,669,857 | B2 | 3/2014 | Sun et al. |
| 9,189,895 | B2 | 11/2015 | Phelan et al. |
| 9,344,683 | B1 | 5/2016 | Nemat-Nasser et al. |
| 9,688,282 | B2 | 6/2017 | Cook et al. |
| 9,761,063 | B2 | 9/2017 | Lambert et al. |
| 9,922,567 | B2 | 3/2018 | Molin et al. |
| 10,065,652 | B2 | 9/2018 | Shenoy et al. |
| 10,336,190 | B2 | 7/2019 | Yokochi et al. |
| 10,460,600 | B2 | 10/2019 | Julian et al. |
| 10,489,222 | B2 | 11/2019 | Sathyanarayana et al. |
| 10,715,976 | B2 | 7/2020 | Hoffner et al. |
| 10,789,840 | B2 | 9/2020 | Boykin et al. |
| 10,848,670 | B2 | 11/2020 | Gatti et al. |
| 11,069,257 | B2 | 7/2021 | Palmer et al. |
| 11,140,236 | B2 | 10/2021 | Davis et al. |
| 11,436,844 | B2 | 9/2022 | Carruthers et al. |
| 11,615,141 | B1 | 3/2023 | Hoye et al. |
| 11,659,060 | B2 | 5/2023 | Davis et al. |
| 11,997,181 | B1 | 5/2024 | Davis et al. |
| 2010/0030586 | A1 | 2/2010 | Taylor et al. |
| 2010/0182398 | A1 | 7/2010 | Mazzilli |
| 2012/0036250 | A1* | 2/2012 | Vaswani ............... G01D 4/004 709/224 |
| 2012/0109418 | A1 | 5/2012 | Lorber |
| 2016/0140872 | A1 | 5/2016 | Palmer et al. |
| 2016/0176401 | A1 | 6/2016 | Pilkington |
| 2017/0200061 | A1 | 7/2017 | Julian et al. |
| 2019/0215688 | A1* | 7/2019 | Zavesky ............... H04L 67/56 |
| 2021/0092141 | A1* | 3/2021 | Gamble ............. H04L 63/1433 |
| 2021/0266373 | A1 | 8/2021 | Davis et al. |
| 2022/0014601 | A1 | 1/2022 | Davis et al. |

OTHER PUBLICATIONS

U.S. Appl. No. 17/447,379 U.S. Pat. No. 11,659,060, filed Sep. 10, 2021, Device Arrangement for Deriving a Communication Data Scheme.

U.S. Appl. No. 18/301,007, filed Apr. 14, 2023, Device Arrangement for Deriving a Communication Data Scheme.

"Presentation on DriveCam Analytics and Data", Findings Related to In-Cab Driver Distraction, [Online] Retrieved from the internet:https: www.fmcsa.dot.gov sites fmcsa.dot.gov files docs MCSAC_201006_DriveCam.pdf, (2010), 50 pgs.

"Netradynes Driveri Platform Delivers Results Beyond Legacy Safety Video Systems", [Online] Retrieved from the internet:https: web.archive.org web 20180209192736 http: netradyne.com solutions , (2018), 7 pgs.

"RideCam System", [Online] Retrieved from the internet:https: www.lightmetrics.co about-us, (2017), 8 pgs.

"Bendix Launches New Wingman Fusion safety system at Mid America Trucking Show", [Online]. Retrieved from the Internet: https: www.oemoffhighway.com electronics sensors proximity-detection-safety-systems press-release 12058015 bendix-launches-new-wingman-fusion-safety-system-at-midamerica-trucking-show, (Mar. 25, 2015), 19 pgs.

"Fleet Complete Vision Telematic Solution", [Online]. Retrieved from the Internet: https: www.firstnet. com content dam firstnet white-papers firstnet-fleet-complete-utilities.pdf, (Apr. 6, 2019), 2 pgs.

"Respondents Invalidity Contentions Supplemental Exhibit CCC Invalidity of U.S. Pat. No. 11,611,621 Omnibus Chart Based on Combinations", 123 pgs.

"Teen Safe Driver Program", [Online]. Retrieved from the Internet:URL: https: online-sd02.drivecam.com Downloads TSD_WebsiteGuide.pdf, 10 pgs.

"ER SV2 Event Recorder", Powerful Technology, [Online]. Retrieved from the Internet:URL: https: www.multivu.com players English 7277351-lytx-activevision-distracted-driving document 52a97b52-6f94-4b11-b83b-8c7d9cef9026.pdf, (2015), 2 pgs.

"DriveCam Introduction Pack", [Online]. Retrieved from the Internet:URL: https: www.iae-services.com.au downloadsDriveCam-Introduction-Pack.pdf, (2012), 32 pgs.

"Sensor Fusion Building the Bigger Picture of Risk", [Online]. Retrieved from the Internet:URL: https: transcanadahvedr.ca wp-content uploads 2022 01 T8080_Deliverable4-DevSmryRpt-FINAL-20180804_English.pdf, (Apr. 12, 2019), 62 pgs.

"Lytx DriveCam Program Adds New Client Centric Enhancements", [Online]. Retrieved from the Internet:URL: https: www. masstransitmag.com safety-security press-release 12265105 lytx-lytx-drivecamtm-program-adds-new-client-centric-enhancements-evolving-the-gold-standard-video-telematics-program, (Oct. 4, 2016), 6 pgs.

"Lytx Video Services Workspace", [Online]. Retrieved from the Internet:URL: https: www.multivu.com players English7899252-lytx-video-services-program docs KeytoLytx_1505780254680-149005849.pdf, (2017).

"Safety Track 4B Driver Risk Management Program", [Online]. Retrieved from the Internet:URL: https: airportscouncil. org wp-content uploads 2019 01 4b-DRIVER-RISK-MANAGEMENT-PROGRAM-Tamika-Puckett-Rob-Donahue.pdf, (Jan. 18, 2019), 29 pgs.

"Driver Speed Management for Fleets", [Online]. Retrieved from the Internet:URL: https: web.archive.org web 20181217230050 https: www.lytx.com en-us fleet-services program-enhancements speed-management-for-fleets, (2018), 9 pgs.

"Lytx announces enhancements to DriveCam system", [Online]. Retrieved from the Internet:URL: https: www.fleetequipmentmag. com lytx-drivecam-system-truck-telematics , (Oct. 7, 2016), 12 pgs.

"NetraDyne Discuss their AI Platform 5G and their vision of the IoT", [Online]. Retrieved from the Internet:URL: https: www.gsma.

(56) References Cited

OTHER PUBLICATIONS com solutions-and-impact technologies internet-of-things news netradyne-interview , (Oct. 3, 2018), 5 pgs.

"Driver i Catches No Stop at Stop Sign", [Online]. Retrieved from the Internet:URL: https: www.youtube.com watch?v=I8sX3X02aJo, (Oct. 3, 2017), 2 pgs.

"New Trucking Tech: Forward-Facing Cameras", [Online]. Retrieved from the Internet:URL: https: supposeudrive.com new-trucking-tech-forward-facing-cameras , (2024), 7 pgs.

"Introducing Driver i TM", [Online]. Retrieved from the Internet:URL: https: web.archive.org web 20160922034006 http: www.netradyne.com solutions.html, 4 pgs.

"Making Roads Safer for Everyone Everywhere", [Online]. Retrieved from the Internet:URL: https: www.lightmetrics. co about-us, 8 pgs.

"Bendix Quick Reference Guide", [Online]. Retrieved from the Internet:URL: https: www.bendix.com media home bw1114_us_ 010.pdf, 165 pgs.

"Bendix Wingman Brochure", [Online]. Retrieved from the Internet:URL: https: www.waterstruck.com assets Bendix-Wingman-Fusion-brochure_Truck-1.pdf, (2015), 10 pgs.

"Reliable telematics solution for utility fleets", Fleet Complete, [Online]. Retrieved from the Internet:URL: https: www.firstnet.com content dam firstnet white-papers firstnet-fleet-complete-utilities.pdf, 2 pgs.

"Respondents Invalidity Contentions Supplemental Exhibit C11 Invalidity of U.S. Pat. No. 11,611,621 Based on Netradyne Driveri", (2018), 100 pgs.

"Respondents Invalidity Contentions Exhibit C14 Invalidity of U.S. Pat. No. 11,611,621 Based on Fleet Complete Vision Telematic Solution", (Apr. 6, 2019), 42 pgs.

Armstrong, Christopher, "Transport Canada Commercial Bus HVEDR Feasibility Study (File No. T8080-160062) Deliverable No. 4", [Online]. Retrieved from the Internet:URL: https: transcanadahvedr.ca wp-content uploads 2022 01 T8080_Deliverable4-DevSmryRpt-FINAL-20180804_English.pdf, (May 11, 2018), 62 pgs.

Basir, "Respondents Invalidity Contentions Exhibit C16 Invalidity of U.S. Pat. No. 11,611,621 Based on U.S. Pat. No. 7,386,376", (Jun. 10, 2008), 52 pgs.

Bendix Wingman Fusion System, "Respondents Invalidity Contentions Exhibit C13 Invalidity of U.S. Pat. No. 11,611,621 Based on Bendix Wingman Fusion System", (2015), 42 pgs.

Boykin, "Respondents Invalidity Contentions Supplemental Exhibit C06 Invalidity of U.S. Pat. No. 11,611,621 Based on U.S. Pat. No. 10,789,840", (Sep. 29, 2020), 105 pgs.

Carruthers, "Respondents Invalidity Contentions Exhibit C21 Invalidity of U.S. Pat. No. 11,611,621 Based on U.S. Pat. No. 11,436,844", (Sep. 6, 2022), 57 pgs.

Hoffner, "Respondents Invalidity Contentions Exhibit C15 Invalidity of U.S. Pat. No. 11,611,621 Based on U.S. Pat. No. 10,715,976", (Jul. 14, 2020), 55 pgs.

Hoye, "Respondents Invalidity Contentions Exhibit C02 Invalidity of U.S. Pat. No. 11,611,621 Based on U.S. Pat. No. 11,615,141", (Mar. 28, 2023), 76 pgs.

Huff, Aaron, "Lytx DriveCam", [Online]. Retrieved from the Internet:URL: https: www.ccjdigital.com business article 14929274 lytx-drivecam, (Apr. 3, 2014), 11 pgs.

Julian, "Respondents Invalidity Contentions Supplemental Exhibit C09 Invalidity of U.S. Pat. No. 11,611,621 Based on U.S. Pat. No. 10,460,600", (Oct. 29, 2019), 49 pgs.

Lytx Drivecam System, "Respondents Invalidity Contentions Exhibit C10 Invalidity of U.S. Pat. No. 11,611,621 Based on Lytx DriveCam, DriveCam Online Platform, Risk Detection Service, and DriveCam Safety Program", (2010), 98 pgs.

Molin, "Respondents Invalidity Contentions Supplemental Exhibit C20 Invalidity of U.S. Pat. No. 11,611,621 Based on U.S. Pat. No. 9,922,567", (Mar. 20, 2018), 70 pgs.

Nemat Nasser, "Respondents Invalidity Contentions Exhibit C03 Invalidity of U.S. Pat. No. 11,611,621 Based on U.S. Pat. No. 9,344,683", (May 17, 2016), 45 pgs.

Nielsen, "Respondents Invalidity Contentions Supplemental Exhibit C01 Invalidity of U.S. Pat. No. 11,611,621 Based on U.S. Pat. No. 8,560,164", (Oct. 15, 2013), 164 pgs.

Palmer, "Respondents Invalidity Contentions Exhibit C08 Invalidity of U.S. Pat. No. 11,611,621 Based on U.S. Pat. No. 11,069,257", (Jul. 20, 2021), 67 pgs.

Pilkington, "Respondents Invalidity Contentions Exhibit C19 Invalidity of U.S. Pat. No. 11,611,621 Based on U.S. Pub. No. 20160176401", (Jun. 23, 2016), 26 pgs.

Ridecam System, "Respondents Invalidity Contentions Exhibit C12 Invalidity of U.S. Pat. No. 11,611,621 Based on LightMetrics RideCam and RideView", (2017), 27 pgs.

Schofield, "Respondents Invalidity Contentions Exhibit C17 Invalidity of U.S. Pat. No. 11,611,621 Based on U.S. Pat. No. 7,526,103", (Apr. 28, 2009), 43 pgs.

Shenoy, "Respondents Invalidity Contentions Supplemental Exhibit C07 Invalidity of U.S. Pat. No. 11,611,621 Based on U.S. Pat. No. 10,065,652", (Sep. 4, 2018), 56 pgs.

Song, Tianyi, "Enhancing GPS with Lane Level Navigation to Facilitate Highway Driving", IEEE Transactions on Vehicular Technology vol. 66 No 6, (Jan. 30, 2017), 13 pgs.

Straight, Brian, "Netradyne using AI to provide intelligent insight into distracted driving", Online]. Retrieved from the Internet:URL: https: www.freightwaves.com news 2017 11 7 netradyne-using-ai-to-provide-intelligent-insight-into-distracted-driving, ], (Nov. 8, 2017), 4 pgs.

Sun, "Respondents Invalidity Contentions Exhibit C18 Invalidity of U.S. Pat. No. 11,611,621 Based on U.S. Pat. No. 8,669,857", (Mar. 11, 2014), 23 pgs.

"U.S. Appl. No. 16/796,762, Non Final Office Action mailed May 27, 2021", 19 pgs.

"U.S. Appl. No. 16/796,762, Response filed Aug. 4, 2021 to Non Final Office Action mailed May 27, 2021", 9 pgs.

"U.S. Appl. No. 16/796,762, Notice of Allowance mailed Aug. 25, 2021", 8 pgs.

"U.S. Appl. No. 17/447,379, Preliminary Amendment filed Oct. 6, 2021", 6 pages.

"U.S. Appl. No. 17/447,379, Non Final Office Action mailed Oct. 14, 2022", 24 pgs.

"U.S. Appl. No. 17/447,379, Response filed Nov. 22, 2022 to Non Final Office Action mailed Oct. 14, 2022", 9 pgs.

"U.S. Appl. No. 17/447,379, Notice of Allowance mailed Jan. 17, 2023", 9 pgs.

"U.S. Appl. No. 18/301,007, Non Final Office Action mailed Nov. 24, 2023", 21 pgs.

"U.S. Appl. No. 18/301,007, Response filed Jan. 24, 2024 to Non Final Office Action mailed Nov. 24, 2023", 8 pgs.

"U.S. Appl. No. 18/301,007, Notice of Allowance mailed Feb. 16, 2024", 9 pgs.

* cited by examiner

DEVICE ARRANGEMENT FOR DERIVING A COMMUNICATION DATA SCHEME

PRIORITY APPLICATION

This application is a continuation of U.S. patent application Ser. No. 18/301,007, filed Apr. 14, 2023, which is a continuation of U.S. patent application Ser. No. 17/447,379, filed Sep. 10, 2021, which is a continuation of U.S. patent application Ser. No. 16/796,762, filed Feb. 20, 2020, the disclosures of which are incorporated herein in their entirety by reference.

TECHNICAL FIELD

Embodiments of the present subject matter relate generally to vehicles and, more specifically, to a device arrangement for deriving a communication data scheme.

BACKGROUND

Modern vehicles include many computer managed features. For example, vehicles include computers that monitor and/or control engine emissions, tire pressure, throttle position, engine temperature, spark plugs, fuel injection, automatic transmission, anti-lock brakes, automated driving, etc. To ensure that these features are performing correctly, vehicle manufacturers utilize testing systems in which diagnostic tools are used to send and receive diagnostic codes to and from vehicles to test specified features and gather diagnostic data describing performance of the vehicle. These diagnostic tools communicate with vehicles using a vehicle bus standard, such as Controller Area Network (CAN) bus, which defines a standardized format for transmitting data frames between nodes at the data link layer. For example, a vehicle bus standard may define which bits in the data frame represent the start-of-frame (SOF), identifier, data length code, data field, etc.

While vehicle manufacturers use a vehicle bus standard for the format of the data frames, the data scheme for the content of the data frames is varied based on the vehicle manufacturer. For example, each vehicle manufacturer may define their own unique communication data scheme, which defines the commands used by vehicle, as well as the format in which data (e.g., diagnostic data) is transmitted within the data field of each data frame.

In many cases, vehicle manufacturers provide materials describing their communication data schemes for use by other entities. These materials, however, may not be fully comprehensive. For example, the materials may omit some portion of the communication data scheme. Accordingly, a customer or other entity may not understand some of the data received from their vehicles and/or how to properly communicate with their vehicle to test certain features or request certain diagnostic data.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
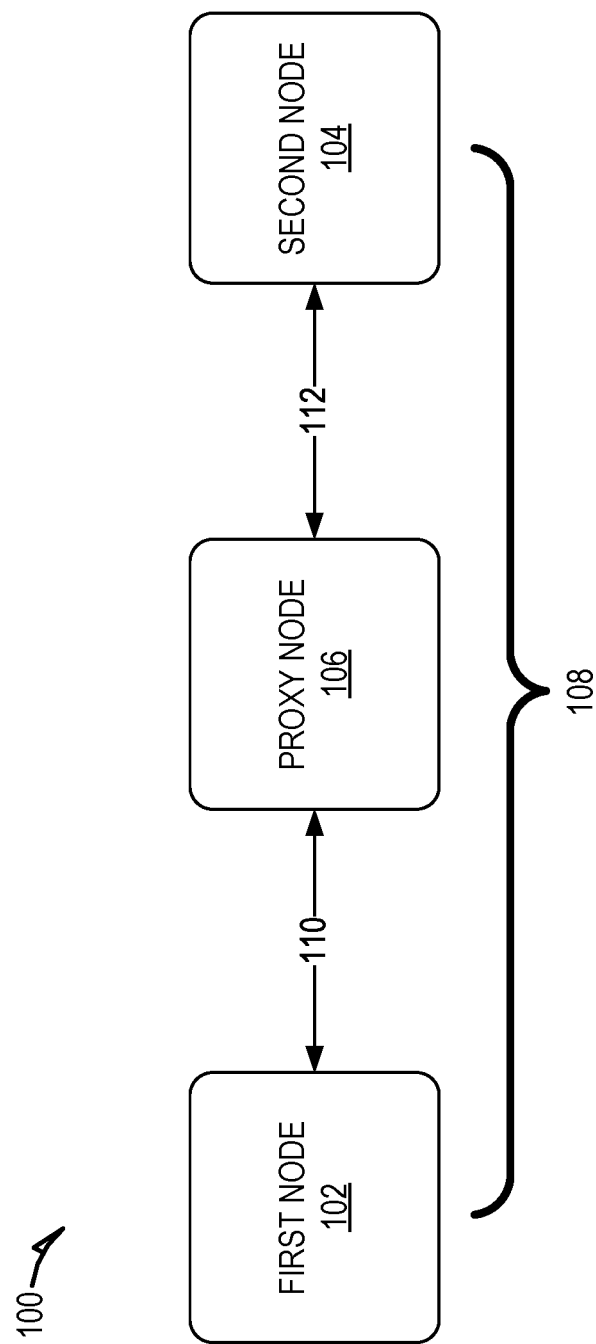
FIG. 1 is a block diagram of a physical in-line device arrangement for deriving unknown portions of a communication data scheme, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for a device arrangement to derive unknown portions of a communication data scheme. A communication data scheme is a defined format for data transmitted in electronic communications among a system of interconnected computing nodes (e.g., sensors, electronic computing nodes (ECUs), actuators, etc.). For example, the system of computing nodes may be sensors, ECUs, and actuation within a vehicle or industrial machine.

The communication data scheme defines the set of available commands that may be transmitted among the nodes, such as commands to request specified data and/or commands to execute a specified action. The communication data scheme also defines a data format used for data (e.g., diagnostic data, sensor data, etc.) included in the data transmissions among the nodes. For example, the communication data scheme may define the units of measurement used for each type of data, how each type of data is encoded and/or decoded, etc.

A communication data scheme may be defined by a manufacturer or other entity for use in computing devices and/or other products developed by the manufacturer. For example, a vehicle manufacturer may define and use a communication data scheme for use in the vehicles they manufacture. As another example, an industrial machine manufacturer may define and use a communication data scheme for use in the industrial machines they manufacture. In some cases, manufacturers offer materials describing the communication data schemes used within their products to other entities. For example, these materials may be made available to other entities for testing purposes, such as to gather and analyze diagnostic data. These materials, however, are often not fully comprehensive in describing the communication data scheme. For example, the materials may omit some portions of the communication data scheme, such as some of the available commands and/or data formats for data transmitted using the communication data scheme.

The device arrangement of the present disclosure provides a solution for deriving unknown portions of a communication data scheme. Specifically, a proxy node is positioned within a communication path between two nodes in the system that use the communication data scheme for transmitting communications. The proxy node functions as an intermediary between the two nodes in the communication path. For example, communications transmitted be each of the nodes via the communication path are initially received by the proxy node, which then forwards the communications along to the other node via the communication path.

The proxy node generates a communication log based on the communications transmitted between the nodes. For example, the proxy node logs communications, such as requests for data, and the corresponding responses that include the requested data. The communication may then be used to derive unknown portions of the communication data scheme.

In some embodiments, the proxy node is positioned within a communication path between a diagnostic tool and a connector of a vehicle, industrial machine, etc. Diagnostic tools are available for many products that use a given communication data scheme. For example, vehicle diagnostic tools are commercially available for use with vehicles produced by most automobile manufacturers. These vehicle diagnostic tools are configured to connect directly to an on-board diagnostic (OBD) system of the vehicle via a standardized digital communication port (e.g., connector) of the vehicle.

Diagnostic tools allow a user to transmit a specified set of commands to the vehicle, industrial machine, etc., and present data received from the vehicle, industrial machine, etc. For example, a vehicle diagnostic tool may allow a user to transmit a command requesting diagnostic data related to a specified component or system of the vehicle, such as the engine or anti-lock braking system, as well as present the data returned in response to the request.

Use of a diagnostic tool with the above described device arrangement allows users to dictate the type of commands that are transmitted along the communication path, which also may dictate the type of data that is returned in response. For example, a user may cause transmission of specified commands that are not defined in the communication data scheme and/or that result in the return of data for which the data format is not defined in the communication data scheme. Knowledge of the commands being transmitted and/or the expected type of data that is returned is used to derive the communication data scheme from the communication log generated by the proxy node.

In some embodiments, the communication path connecting the two nodes may be a physical in-line communication path. For example, the communication path may include a physical connection between each of the nodes and the proxy node. Alternatively, in some embodiments, a portion of the communication path may be a wireless connection. For example, a first node (e.g., a diagnostic tool) may be connected to the proxy node via an in-line physical connection and the proxy node may be connected to the second node (e.g., vehicle) via a wireless connection facilitated by a network gateway device (e.g., vehicle gateway) connected to the second node.

A device configuration using a wireless communication path provides several advantages. For example, the device configuration is not limited by the length of the physical in-line communication. This is particularly useful when deriving a communication data scheme used by a vehicle (e.g., one of the nodes is a connector of a vehicle OBD system) as the vehicle may be used (e.g., driven) in its regular course of business rather than being limited to a particular location in which the vehicle remains physically connected to a diagnostic tool. This provides another advantage in that communication paths may be established with multiple vehicles, thereby allowing a larger quantity of communication data to be logged by the proxy node.

The communication log generated by the proxy node can be analyzed by human reviewers to derive unknown portions of the communication data scheme. For example, human reviewers may identify logged data from communications transmitted by a diagnostic as a result of using diagnostic tool to send a specified command, from which the format for transmitting the specified command in the communication scheme can be derived. As another example, human reviewers may identify logged data from communications returned to the diagnostic tool in response to a command for a specified type of data, from which the format for transmitting the specified type of data in the communication scheme can be derived.

In some embodiments, the communication log generated by the proxy node can be analyzed using data analysis algorithms and/or machine learning models to derive the unknown portions of the communication data scheme. For example, the communication log may be provided to a data scheme derivation system, which employs data analysis algorithms and/or machine learning models to derive the unknown portions of the communication data scheme. Further, in some embodiments, the data scheme derivation system may at least partially control operation of the diagnostic tool and/or vehicle, industrial machine, etc., from which diagnostic data is being recorded. For example, the communication data scheme may synchronize operations of transmission of specified commands by the diagnostic tool while causing a vehicle or industrial machine to perform specified actions, such as accelerating, braking, etc. The synchronized actions may be used to cause specified patters or other discernable changes in the communication data logged by the proxy node, which can be used to derive the unknown portions of the communication data scheme.

FIG. 1 is a block diagram of a physical in-line device arrangement 100 for deriving unknown portions of a communication data scheme, according to some example embodiments. As shown, the device arrangement 100 includes a first node 102, a second node 104 and a proxy node 106. Each node (e.g., the first node 102, second node 104 and proxy node 106) may be any type of general computing device capable of network communication with other computing devices (e.g., nodes). For example, each node can include some or all of the features, components, and peripherals of the machine 800 shown in FIG. 8.

As shown in FIG. 1, the proxy node 106 is established within a communication path 108 between the first node 102 and the second node 104. That is, the communication path 108 includes a first portion 110 that connects the first node 102 and the proxy node 106, and a second portion 112 that connects the proxy node 106 and the second node 104.

The communication path 108 is a physical in-line communication path, meaning that the first portion 110 and the second portion 112 of the communication path 108 are established using a physical wire or cable. For example, the first portion 110 of the communication path 108 is established using a physical wire or cable that is connected to the first node 102 and the proxy node 106, and the second portion 112 of the communication path 108 is established using a physical wire or cable that connected to the proxy node 106 and the second node 104.

The first node 102 and the second node 104 transmit communications to each other via the communication path 108. For example, a communication transmitted by the first node 102 to the second node 104 is initially transmitted across the first portion 110 of the communication path 108 and received by the proxy node 106. The proxy node 106 then transmits the communication received from the first node 102 to the second node 104 via the second portion 112 of the communication path 108. Likewise, a communication transmitted by the second node 104 to the first node 102 is initially transmitted across the second portion 112 of the communication path 108 and received by the proxy node 106. The proxy node 106 then transmits the communication received from the second node 104 to the first node 102 via the first portion 110 of the communication path 108.

Communications transmitted between the first node 102 and the second node 104 may be transmitted using a vehicle bus standard, such as CAN bus, and a communication data scheme. The vehicle bus standard defines a standardized format for transmitting data frames between nodes, whereas the communication data scheme defines the set of available commands and data format for data included in the communications. As explained earlier, materials describing the communication data scheme may be available, but are often not fully comprehensive in describing the communication data scheme. For example, the materials may omit some portions of the communication data scheme, such as some of the available commands and/or data formats for data transmitted using the communication data scheme The shown device arrangement 100 provides a solution for deriving unknown portions of a communication data scheme. To accomplish this, the proxy node 106 logs communication data from communications transmitted between the first node 102 and the second node 104 via the communication path 108. For example, the proxy node 106 updates a communication log with communication data from the communications received by the proxy node 106 from either the first node 102 or the second node 104.

The communication data logged by the proxy node 106 may include all or a subset of the data included in each received communication. For example, the communication data may include each bit of the received communication. Alternatively, the communication data logged by the proxy node 106 may include a subset of the bits of the received communication. For example, the communication data may include select portions of the communications, such as the bits that represent the identifier and/or data field of the communication.

In some embodiments, the proxy node 106 may add additional metadata to the logged communication data. For example, the proxy node 106 may add a time stamp value indicating the time at which the communication was received by the proxy node 106. As anther example, the proxy node 106 may add metadata identifying the source node from which the communication was received and/or the destination node to which the communication was addressed.

The communication data included in the communication log is used to derive unknown portions of the communication data scheme. For example, human users may analyze the communication data to identify repeated data, which may represent commands in the communication data scheme. As another example, human reviewers may analyze the communication data to identify patterns in the communication data that represent diagnostic data, from which the data format may be derived. Alternatively, the communication log may be provided to a data scheme derivation system (not shown), which employs data analysis algorithms and/or machine learning models to derive the unknown portions of the communication data scheme.

In some embodiments, a diagnostic tool may be used to further aide in the process of deriving the communication data scheme. Diagnostic tools are available for many products that use a given communication data scheme. For example, vehicle diagnostic tools are commercially available for use with vehicles produced by most automobile manufacturers. These vehicle diagnostic tools are configured to connect directly to an OBD system of the vehicle via a standardized digital communication port (e.g., connector) of the vehicle.

Diagnostic tools allow a user to transmit a specified set of commands to the vehicle, industrial machine, etc., as well as to present data received from the vehicle, industrial machine, etc. For example, a vehicle diagnostic tool may allow a user to transmit a command requesting diagnostic data related to a specified component or system of the vehicle, such as the engine or anti-lock braking system, as well as present the data returned in response to the request.

Use of a diagnostic tool within the device arrangement 100 allows users to dictate the type data that is transmitted along the communication path 110 between the first node 102 and the second node 104. For example, the first node 102 may be a diagnostic tool and the second node 104 may be a connector of a vehicle that provides access to the OBD system of the vehicle. A user may use the diagnostic tool to transmit specified commands via the communication path 110. For example, a user may use the diagnostic tool to send commands for which the defined format in the communication data scheme is unknows. As another example, a user may use the diagnostic tool to send commands to request data type for which the defined data format in the communication data scheme is unknown. The proxy node 106 logs communication transmitted between the first node 102 and the second node 104 as a result of commands being transmitted by the diagnostic tool, which may then be analyzed to determine the unknown portions off the communication data scheme.

Figure 2:
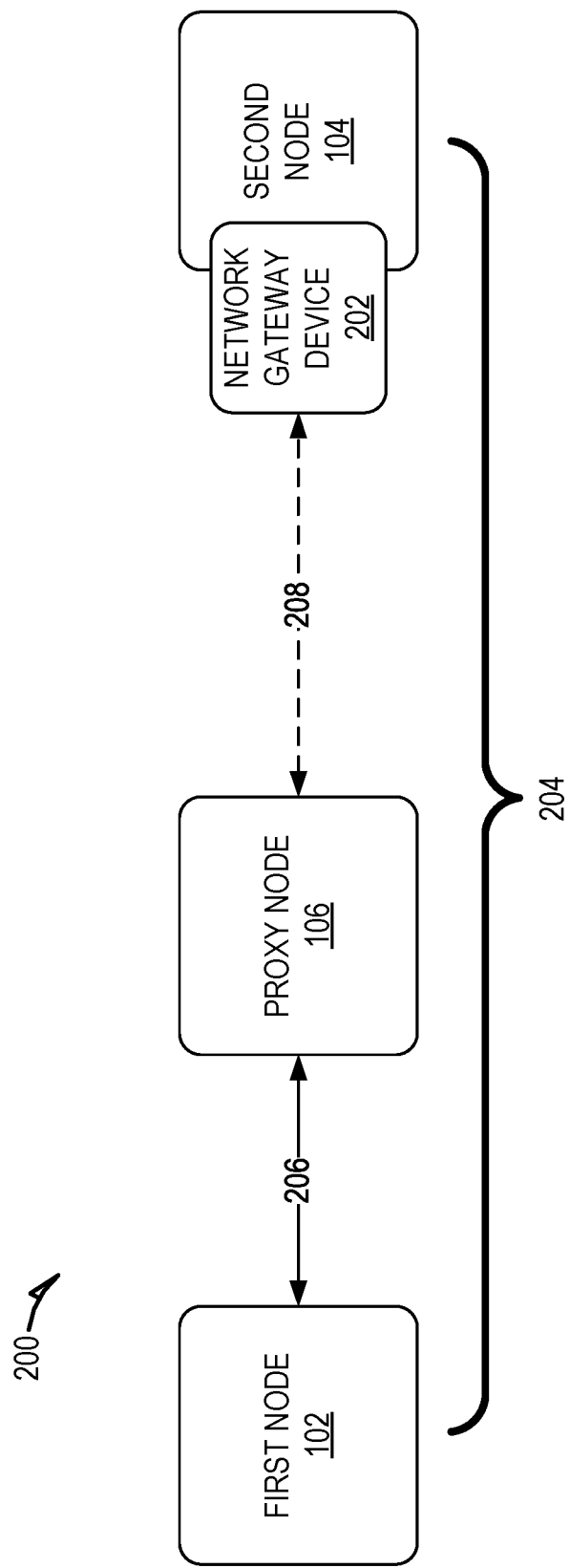
FIG. 2 is a block diagram of a wireless device arrangement for deriving unknown portions of a communication data scheme, according to some example embodiments.

FIG. 2 is a block diagram of a wireless device arrangement 200 for deriving unknown portions of a communication data scheme, according to some example embodiments. As shown, the device arrangement 200 includes a first node 102, a second node 104, a proxy node 106 and a network gateway device 202. The proxy node 106 is established within a communication path 204 between the first node 102 and the second node 104. That is, the communication path 204 includes a first portion 206 that connects the first node 102 and the proxy node 106, and a second portion 208 that connects the proxy node 106 and the second node 104.

The communication path 204 is partially wireless, meaning that at least a portion of the communication path 204 is a wireless connection rather than a physical in-line connection. For example, as shown the first portion 206 of the communication path 204 that connects the first node 102 and the proxy node 106 is a physical in-line connection, whereas the second portion 208 of the communication path 204 that connects the proxy node 106 and the second node 104 is wireless. The wireless connection is facilitated by the network gateway device 202 (e.g., vehicle gateway), which is connected to the second node 104.

The network gateway device 202 is a hardware device that acts as a gate to a network and enables traffic to flow in and out of the network to other networks. For example, the network gateway device 202 may be established as an edge device of the OBD system of a vehicle and/or other network or system of nodes within a vehicle or industrial machine. For example, the network or system of nodes may include a variety of sensors, ECUs, actuators, etc., deployed within a vehicle or industrial machine.

The network gateway device 202 allows for electronic communications to the second node 104 by providing wireless communication capabilities. For example, the network gateway device 202 is enabled to connect with wireless networks (e.g., cellular, wireless local area network, satellite communication networks, etc.), for purposes of communicating with other devices. The network gateway device 202 may also provide additional functionality, such as firewall functionality by filtering inbound and outbound communications, disallowing incoming communications from suspicious or unauthorized sources, etc.

Use of the network gateway device 202 at the second node 104 allows for the partially wireless device configuration 200 shown in FIG. 2. A partially wireless device configuration 200 provides several benefits over a physical in-line device arrangement 100 as shown in FIG. 1. For example, a partially wireless device configuration 200 allows for greater flexibility as the first node 102 and the second node 104 are not required to be within a certain geographic distance of each other based on the length of the cord, wire or cable used to create the physical in-line connections between the first node 102 and the second node 104. This is particularly useful when working with vehicles such as cars or trucks, as these vehicles can be driven in their regular course of business rather than being limited to a particular location in which the vehicle remains physically connected to a diagnostic tool. This is also advantageous when working with non-mobile devices, such as industrial machines, as the communication path 204 may be established remotely.

Another advantage of the partially wireless device configuration 200 is that wireless connections may be established between the proxy node 106 and multiple second nodes 104. An example of this is shown in FIG. 3, which is a block diagram of a wireless device arrangement 300 for deriving unknown portions of a communication data scheme that includes a proxy node 106 wirelessly communicating with multiple nodes, according to some example embodiments.

As show, the proxy node 106 is wirelessly connected to multiple second nodes 104 via network gateway devices 202 connected to each second node 104. This device arrangement 300 allows for the proxy node 106 to log communications transmitted between the first node 102 and multiple second nodes 104, thereby increasing efficiency when generating the communication log. For example, commands transmitted by the first node 102 via the communication path 204 are initially received and logged by the proxy node 106. The proxy node 106 transmits the received command to multiple second nodes 104 via wireless connections established between the proxy node 106 and the network gateway device 202 connected to each second node 104. Similarly, communications transmitted by the second nodes 104 in response to the command are initially received and logged by the proxy node 106, which then transmits the communications to the first node 102 via the first portion 206 of the communication path 204.

In this type of embodiment, the communication data logged by the proxy node 106 may include an identifier identifying the second node 104, either individually or as part of a group, to which a communication is directed or received. For example, the communication data may include an identifier that identifies a specific vehicle or industrial machine. As another example, the communication data may include an identifier that identifies a manufacturer that manufactured the vehicle or industrial machine. As another example, the communication data may include an identifier that identifies a customer associated with the vehicle or industrial machine. The use of the identifier allows for the communication data included in the communication log to be parsed and/or searched to identify communication data associated with a particular vehicle/industrial machine, manufacturer, or customer.

Figure 3:
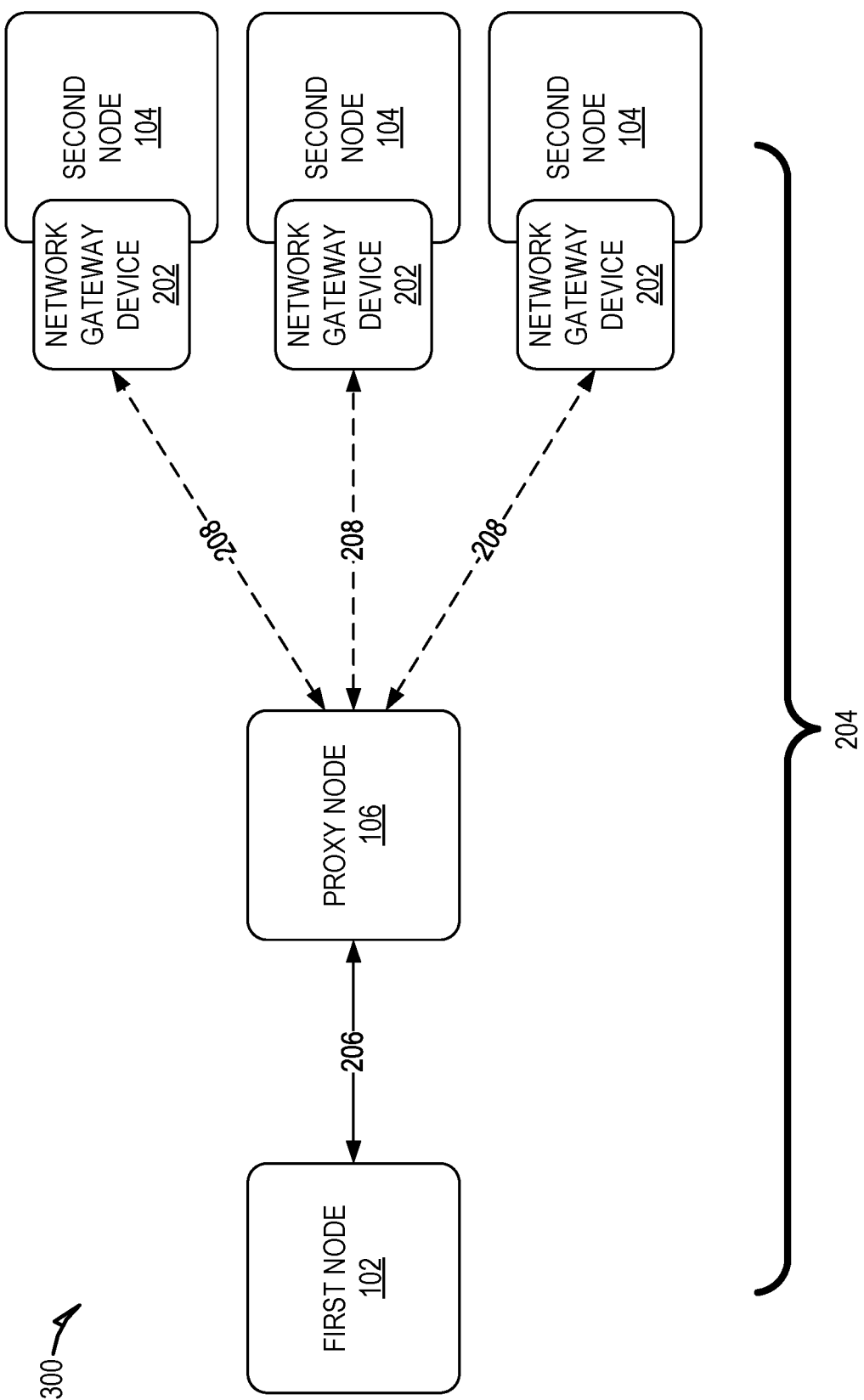
FIG. 3 is a block diagram of a wireless device arrangement for deriving unknown portions of a communication data scheme that includes a proxy node wirelessly communicating with multiple nodes, according to some example embodiments.

The arrangement 300 shown in FIG. 3 is particularly useful in embodiments in which communications are transmitted to mobile or remote devices, such as vehicles and/or industrial machines allocated at various geographic locations. For example, the first node 102 and proxy node 1096 may communicate with each second node 104 from a central location. Accordingly, the vehicles may be used in their normal course of business. Similarly, the first node 102 and the proxy node 106 do not have to be established at each geographic location where an industrial machine is located given that adequate wireless network access is available at the geographic location.

Figure 4:
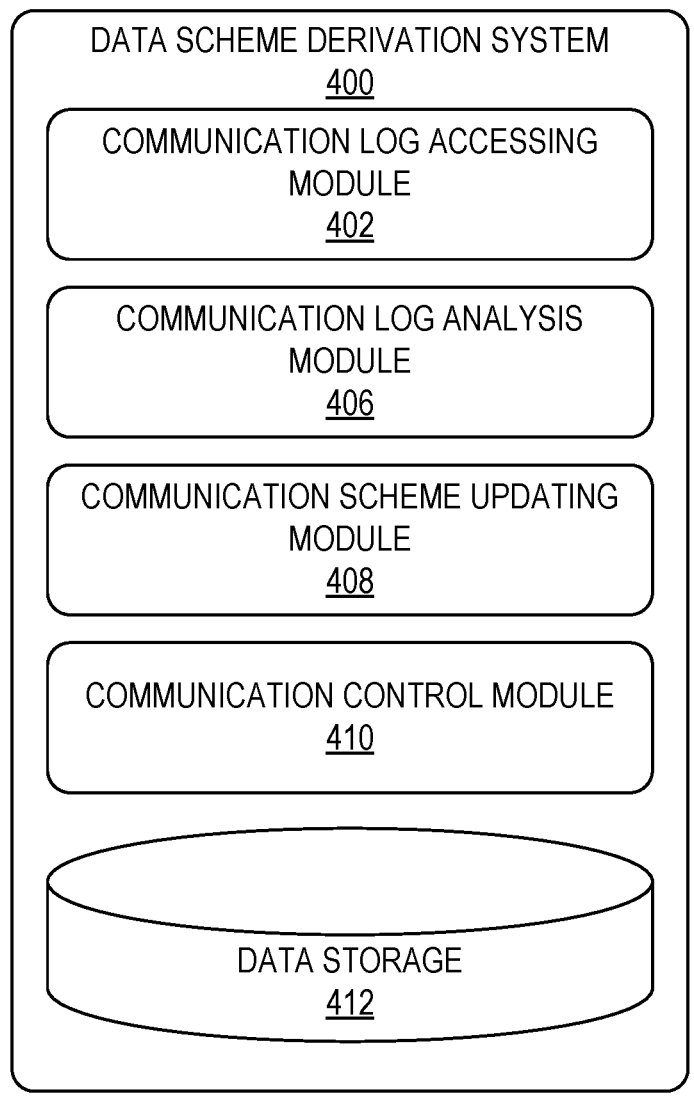
FIG. 4 is a block diagram of a data scheme derivation system, according to some example embodiments.

FIG. 4 is a block diagram of a data scheme derivation system 400, according to some example embodiments. The data scheme derivation system 400 may be used in conjunction with either a physical in-line device arrangement 100 (e.g., shown in FIG. 1) or a wireless device arrangement 200, 300 (e.g., shown in FIGS. 2 & 3) to derive unknown portions of a communication data scheme. For example, the data scheme derivation system 300 may be in network communication with the proxy node 106 and/or the first node 102 and second node(s) 104 to share data and/or transmit/receive commands.

The data scheme derivation system 400 may be implemented using one or more computing devices. A computing device may be any type of general computing device capable of network communication with other computing devices (e.g., nodes). For example, a computing device can include some or all of the features, components, and peripherals of the machine 800 shown in FIG. 8. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the data scheme derivation system 400 to facilitate additional functionality that is not specifically described herein. Furthermore, the various functional modules depicted in FIG. 4 may reside on a single computing device or may be distributed across several computing devices in various arrangements such as those used in cloud-based architectures. For example, some functionality of the data scheme derivation system 300 may be performed by the proxy node 106

As shown, the data scheme derivation system 400 includes a communication log accessing module 402, a communication log analysis module 406, a communication scheme updating module 408, a communication control module 410, and a data storage 412.

The communication log accessing module 402 communicates with the proxy node 106 to access the communication log generated by the proxy node 106. For example, the communication log accessing module 402 may transmit a request to the proxy node for the communication log, which the proxy node 106 may return in response. As another example, the proxy node 106 may transmit the communication log to the data scheme derivation system 400, which is received by the communication log accessing module 402. For example, the proxy node 106 may transmit the communication log periodically, in response to occurrence of specified events, and/or in response to a user-initiated command at the proxy node 106.

The communication log accessing module 402 may store the communication log to the data storage 412, where it may be accessed by the other module of the data scheme derivation system 400. Alternatively, the communication log accessing module 402 may read the communication log from the proxy node 106 without writing a copy of the communication log to the data storage 412.

The communication log analysis module 406 analyses the communication data included in the communication log to determine unknown portions of the communication data scheme. For example, the communication log analysis module 406 may employ data analysis algorithms and/or machine learning models on the communication data to derive the unknown portions of the communication data scheme.

The communication scheme updating module 408 updates a file (e.g., document, spreadsheet, etc.) describing the communication data scheme. For example, the data scheme derivation system 400 may maintain the file in the data storage 412. The file may list known portions of the communication data scheme, such as commands, data formats, etc. The communication scheme updating module 408 accesses the file from the data storage 412 to update the file when previously unknown portions of the communication scheme are determined. For example, the communication scheme updating module 408 may update the file to add previously unknown commands and/or data formats.

The communication control module 410 communicates with the first node 102 and/or the second node 104 to cause either to perform specified actions, which may aide in deriving unknown portions of the communication data scheme. For example, communication control module 410 may communicate with a diagnostic tool to cause the diagnostic tool to transmit specified commands that are unknown in the communication data scheme. The communications logged by the proxy node 106 as a result of these commands may be analyzed to derive the command in the communication data scheme.

As another example, the communication control module 410 may communicate with a vehicle or industrial machine to cause certain output, which may be recorded in the resulting diagnostic data. For example, the communication control module 410 may cause a vehicle to accelerate at a steady rate for a specified period of time. The caused increase in speed and/or acceleration is reflected in the communication data logged by the proxy node 106, which may be analyzed to derive the data format for transmitting speed or acceleration data. For example, the communication data logged during this period of time may be analyzed for an increase or steady change in values, which indicates that the data represents the caused change in speed or acceleration. Once identified, the portion of data may be further analyzed to derive the data format, such as the units of measurement used, how the data is encoded, and/or how the data should be decoded.

In some embodiments, the communication control module 410 may cause synchronized actions by both the first node 102 and the second node 104. For example, the communication control module 410 may cause a diagnostic tool to transmit commands for a specified type of data, while simultaneously causing a vehicle or industrial machine to perform an action causing a change in output for that specified type of data. The change in output caused may be a pattern that is easy to detect, such as a patterned increase and decrease of the output, or a steady increase or decrease of the output.

Figure 5:
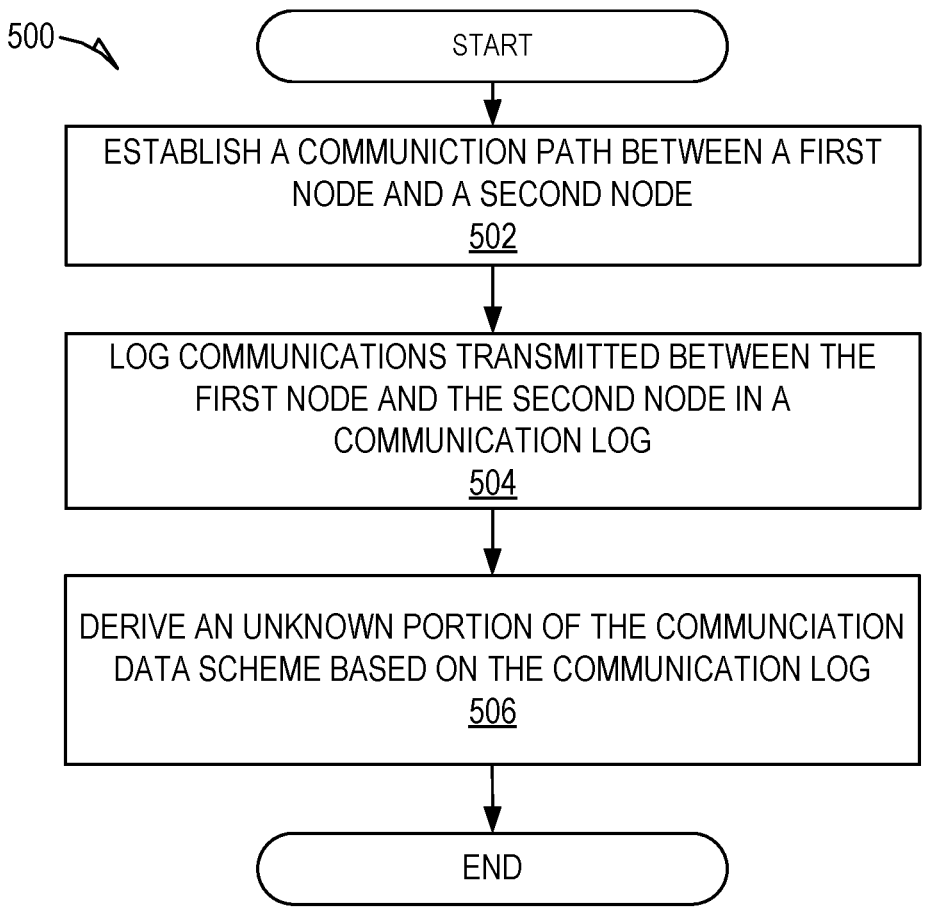
FIG. 5 is a flowchart showing an example method of deriving unknown portions of a communication data scheme, according to some example embodiments.

FIG. 5 is a flowchart showing an example method of deriving unknown portions of a communication data scheme, according to some example embodiments. The method 500 may be embodied in computer readable instructions for execution by one or more processors such that the operations of the method 500 may be performed in part or in whole by the proxy node 106; accordingly, the method 500 is described below by way of example with reference thereto. However, it shall be appreciated that at least some of the operations of the method 500 may be deployed on various other hardware configurations and the method 500 is not intended to be limited to the proxy node 106.

At operation 502, the proxy node 106 establishes a communication path between a first node 102 and a second node 104. The communication path can be a physical in-line communication path 108 or a partially wireless communication path 204. The communication path allows for the first node 102 and the second node 104 to transmit communications to/from each other via the communication path. For example, a communication transmitted by the first node 102 to the second node 104 is initially received by the proxy node 106, which then transmits the communication received from the first node 102 to the second node 104. Likewise, a communication transmitted by the second node 104 to the first node 102 is initially received by the proxy node 106, which then transmits the communication received from the second node 104 to the first node 102.

At operation 504, the proxy node 106 logs communications transmitted between the first node 102 and the second node 104. For example, the proxy node 106 updates a communication log with communication data from the communications received by the proxy node 106 from either the first node 102 or the second node 104.

The communication data logged by the proxy node 106 may include all or a subset of the data included in each received communication. For example, the communication data may include each bit of the received communication. Alternatively, the communication data logged by the proxy node 106 may include a subset of the bits of the received communication. For example, the communication data may include select portions of the communications, such as the bits that represent the identifier and/or data field of the communication.

In some embodiments, the proxy node 106 may add additional metadata to the logged communication data. For example, the proxy node 106 may add a time stamp value indicating the time at which the communication was received by the proxy node 106. As anther example, the proxy node 106 may add metadata identifying the source node from which the communication was received and/or the destination node to which the communication was addressed.

The communication data included in the communication log is used to derive unknown portions of the communication data scheme. For example, human users may analyze the communication data to identify repeated data, which may represent commands in the communication data scheme. As another example, human reviewers may analyze the communication data to identify patterns in the communication data that represent diagnostic data, from which the data format may be derived.

Alternatively, at operation 506, the data scheme derivation system 400 derives an unknown portion of the communication data scheme based on the communication log. For example, the communication log may be provided to the data scheme derivation system 400 which employs data analysis algorithms and/or machine learning models to derive the unknown portions of the communication data scheme. An example, of the data scheme derivation system 400 derives an unknown portion of the communication data scheme is described below in relation to FIG. 6.

Figure 6:
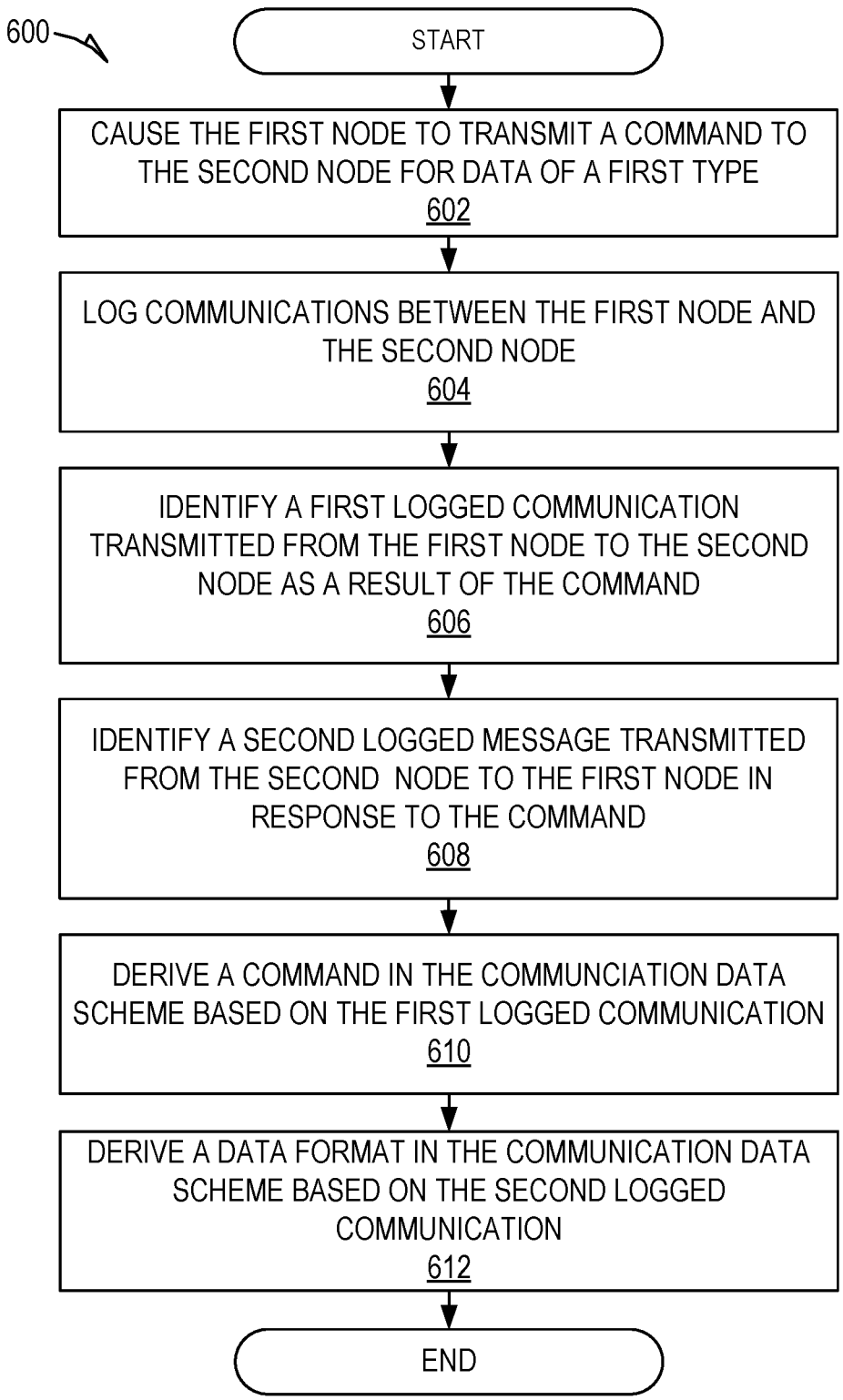
FIG. 6 is a flowchart showing an example method of deriving unknown portions of a communication data scheme, according to some example embodiments.

FIG. 6 is a flowchart showing an example method 600 of deriving unknown portions of a communication data scheme, according to some example embodiments. The method 600 may be embodied in computer readable instructions for execution by one or more processors such that the operations of the method 600 may be performed in part or in whole by the data scheme derivation system 400 and the proxy node 106; accordingly, the method 600 is described below by way of example with reference thereto. However, it shall be appreciated that at least some of the operations of the method 600 may be deployed on various other hardware configurations and the method 600 is not intended to be limited to the data scheme derivation system 400 and the proxy node 106.

At operation 602, the communication control module 410 causes the first node 102 to transmit a command to the second node 104 for data of a first type. The communication control module 410 communicates with the first node 102 and/or the second node 104 to cause either to perform specified actions, which may aide in deriving unknown portions of the communication data scheme. For example, communication control module 410 may communicate with a diagnostic tool to cause the diagnostic tool to transmit specified commands that are unknown in the communication data scheme.

At operation 604, the proxy node 106 logs communications between the first node 102 and the second node 104. The logged communications include communications transmitted as a result of the first node 102 transmitting the command, such as communications transmitted from the first node to the second node 104 to transmit the command, as well as communications transmitted from the second node 104 to the first node 102 in response to the second node 104 receiving the command.

At operation 606, the communication log analysis module 406 identifies a first logged communication transmitted from the first node 102 to the second node 104 as a result of the command. For example, the communication log analysis module 406 may use timestamp values associated with the communications logged in the communication log to identify a communication received from the first node 102 that was logged after the communication control module 410 causes the first node 102 to transmit the command to the second node 104.

At operation 608, the communication log analysis module 406 identifies a second logged communication transmitted from the second node 104 to the first node 102 in response to the command. The communication log analysis module 406 may use timestamp values associated with the communications logged in the communication log to identify a communication received from the second node 104 that was logged after the proxy node 106 forwarded the command to the second node 104.

At operation 610, the communication log analysis module 406 derives the command in the communication data scheme based on the first logged communication. As the first logged communication includes the command, communication log analysis module 406 may derive the command in the communication data scheme from the payload of the communication. Similarly, at operation 612, the communication log analysis module 406 derives the data format in the communication data scheme based on the second logged message. The second logged communication includes data of the first type. Accordingly, the communication log analysis module 406 may derive the data format based on the payload of the second logged communication.

Software Architecture

Figure 7:
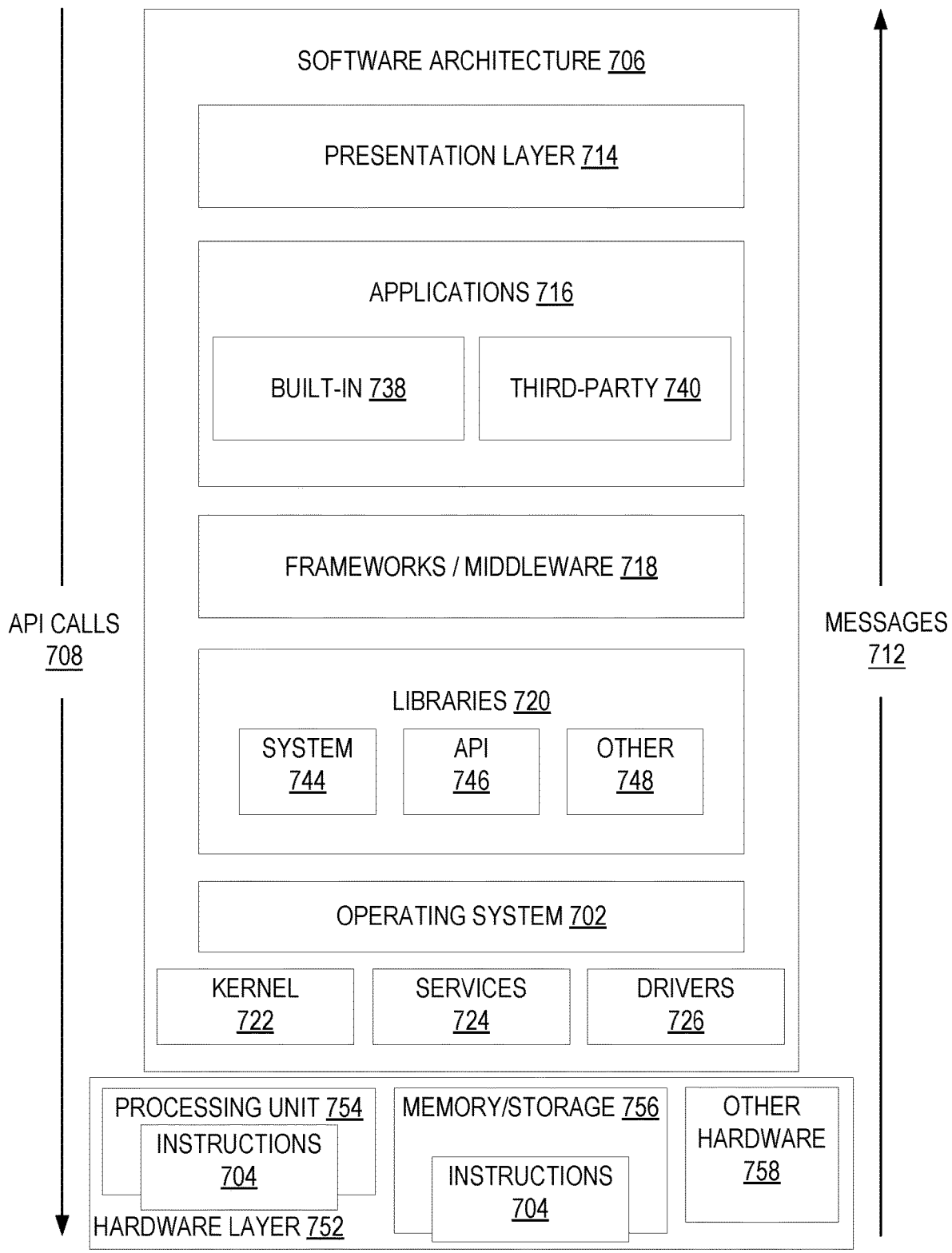
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
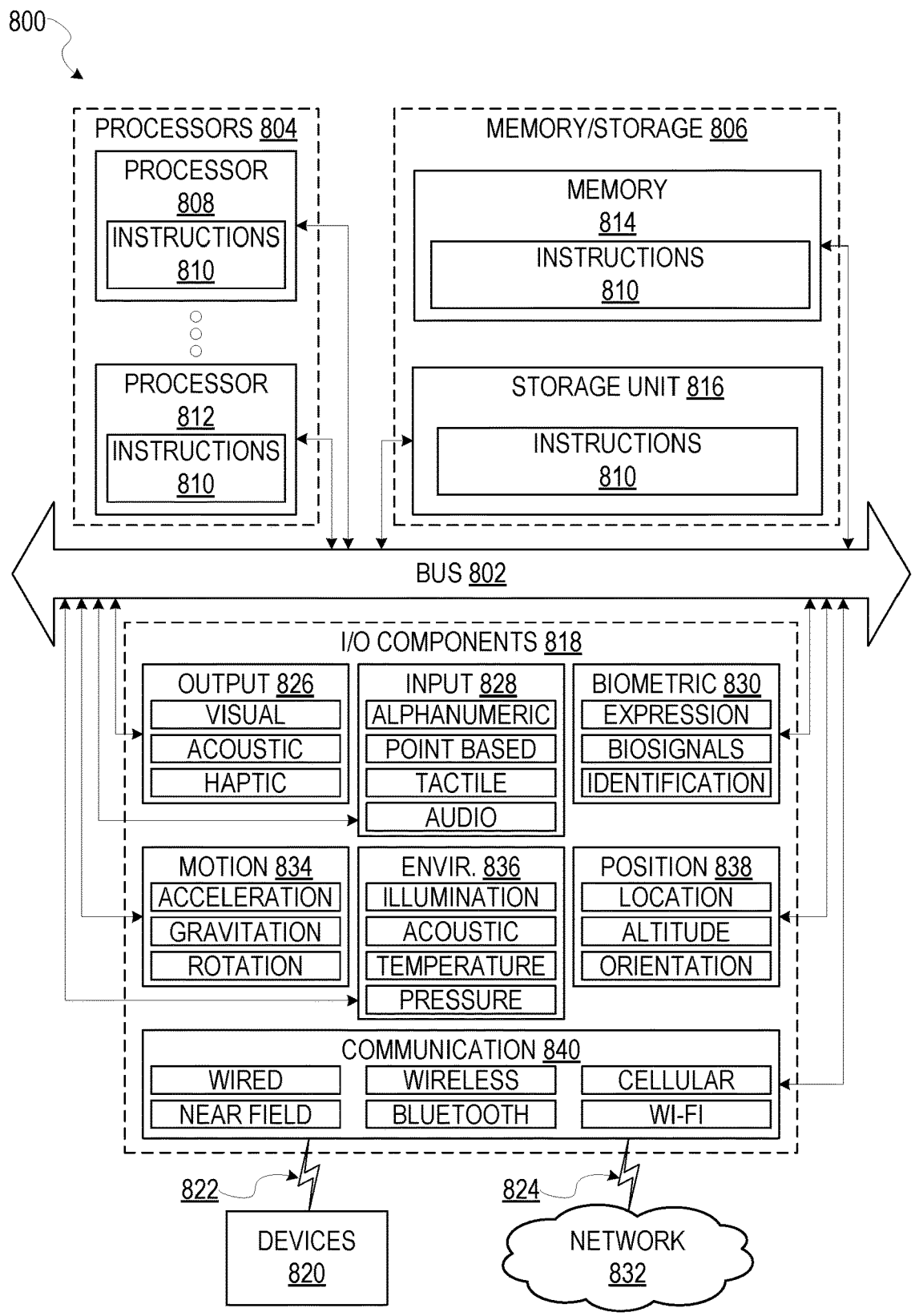
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components.

Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method for monitoring a vehicle fleet, comprising:
   establishing a communication path between a computing device and an on-board diagnostic (OBD) system coupled with a network gateway device installed on a vehicle in the vehicle fleet, a first portion of the communication path connecting the computing device to a proxy node, and a second portion of the communication path connecting the proxy node to the OBD system, the proxy nodes being connected to the OBD system via the network gateway device;

causing the computing device to transmit a request to the OBD system, the computing device being connected to the OBD system via the communication path;

logging, at the proxy node located within the communication path, data transmitted from the the OBD system in response to the request; and displaying, by the computing device, the logged data.

2. The method of claim 1, wherein the communication path is a wireless connection.

3. The method of claim 1, wherein the logged data transmitted from the OBD system comprises one or more fault codes.

4. The method of claim 1, wherein the logged data transmitted from the OBD system comprising barometric pressure data.

5. The method of claim 1, wherein the logged data transmitted from the OBD system comprising diagnostic data related to an engine system of the vehicle.

6. The method of claim 1, wherein the logged data transmitted from the OBD system comprising speed data.

7. The method of claim 1, wherein the logged data transmitted from the OBD system comprising fuel data.

8. The method of claim 1, wherein the logged data transmitted from the OBD system comprising temperature data.

9. The method of claim 1, further comprises determining a communication data scheme based on the data logged at the proxy node.

10. A system for monitoring a vehicle in a vehicle fleet, comprising:
  one or more computer processors; and
  one or more non-transitory computer-readable mediums storing instructions that, when executed by the one or more computer processors, cause the system to perform operations comprising:
  establishing a communication path between a computing device and an on-board diagnostic (OBD) system coupled with a network gateway device installed on a vehicle in the vehicle fleet, a first portion of the communication path connecting the computing device to a proxy node, and a second portion of the communication path connecting the proxy node to the OBD system, the proxy nodes being connected to the OBD system via the network gateway device;

causing the computing device to transmit a request to the OBD system, the computing device being connected to the OBD system via the communication path;

logging, at the proxy node located within the communication path, data transmitted from the the OBD system in response to the request; and displaying, by the computing device, the logged data.

11. The system of claim 10, wherein the communication path is a wireless connection.

12. The system of claim 10, wherein the logged data transmitted from the OBD system comprises one or more fault codes.

13. The system of claim 10, wherein the logged data transmitted from the OBD system comprising barometric pressure data.

14. The system of claim 10, wherein the logged data transmitted from the OBD system comprising diagnostic data related to an engine system of the vehicle.

15. The system of claim 10, wherein the logged data transmitted from the OBD system comprising speed data.

16. The system of claim 10, wherein the logged data transmitted from the OBD system comprising fuel data.

17. The system of claim 10, wherein the logged data transmitted from the OBD system comprising temperature data.

18. A non-transitory computer-readable medium storing instructions that, when executed by one or more computer processors of a machine for monitoring a vehicle in a vehicle fleet, cause the machine to perform operations comprising:
  establishing a communication path between a computing device and an on-board diagnostic (OBD) system coupled with a network gateway device installed on a vehicle in the vehicle fleet, a first portion of the communication path connecting the computing device to a proxy node, and a second portion of the communication path connecting the proxy node to the OBD system, the proxy nodes being connected to the OBD system via the network gateway device;

causing the computing device to transmit a request to the OBD system, the computing device being connected to the OBD system via the communication path;

logging, at the proxy node located within the communication path, data transmitted from the the OBD system in response to the request; and displaying, by the computing device, the logged data.

* * * * *